United States Patent
Heemann et al.

(10) Patent No.: US 10,233,364 B2
(45) Date of Patent: Mar. 19, 2019

(54) EXTRUDABLE HOTMELT ADHESIVES BASED ON BRANCHED SIS POLYMERS

(71) Applicant: HENKEL AG & CO. KGAA, Duesseldorf (DE)

(72) Inventors: Marcus Heemann, Neuss (DE); Sebastian Kostyra, Monheim (DE); Eckhard Puerkner, Duesseldorf (DE); Dirk Kasper, Duesseldorf (DE)

(73) Assignee: HENKEL AG & CO. KGAA, Duesseldorf (DE)

( * ) Notice: Subject to any disclaimer, the term of this patent is extended or adjusted under 35 U.S.C. 154(b) by 272 days.

(21) Appl. No.: 15/183,871

(22) Filed: Jun. 16, 2016

(65) Prior Publication Data
US 2016/0289504 A1 Oct. 6, 2016

Related U.S. Application Data

(63) Continuation of application No. PCT/EP2014/076574, filed on Dec. 4, 2014.

(30) Foreign Application Priority Data

Dec. 17, 2013 (DE) .................. 10 2013 226 255

(51) Int. Cl.

| | | |
|---|---|---|
| *C09J 125/04* | (2006.01) | |
| *C09J 153/02* | (2006.01) | |
| *B32B 7/12* | (2006.01) | |
| *B32B 27/32* | (2006.01) | |
| *B32B 27/36* | (2006.01) | |
| *C09J 125/02* | (2006.01) | |
| *B32B 27/30* | (2006.01) | |
| *B32B 27/08* | (2006.01) | |
| *B32B 27/20* | (2006.01) | |
| *B32B 27/22* | (2006.01) | |
| *C09J 7/35* | (2018.01) | |
| *C09J 7/22* | (2018.01) | |
| *C08L 53/02* | (2006.01) | |
| *C08L 91/00* | (2006.01) | |
| *C09J 7/38* | (2018.01) | |

(52) U.S. Cl.
CPC .............. *C09J 125/02* (2013.01); *B32B 7/12* (2013.01); *B32B 27/08* (2013.01); *B32B 27/20* (2013.01); *B32B 27/22* (2013.01); *B32B 27/302* (2013.01); *B32B 27/32* (2013.01); *B32B 27/327* (2013.01); *B32B 27/36* (2013.01); *C08L 53/02* (2013.01); *C08L 53/025* (2013.01); *C08L 91/00* (2013.01); *C09J 7/22* (2018.01); *C09J 7/35* (2018.01); *C09J 153/02* (2013.01); *C09J 153/025* (2013.01); *B32B 2250/24* (2013.01); *B32B 2307/4026* (2013.01); *B32B 2323/04* (2013.01); *B32B 2367/00* (2013.01); *B32B 2405/00* (2013.01); *B32B 2439/00* (2013.01); *C08L 2205/02* (2013.01); *C09J 7/387* (2018.01); *C09J 125/04* (2013.01); *C09J 2205/114* (2013.01); *C09J 2423/00* (2013.01); *C09J 2425/00* (2013.01); *C09J 2467/00* (2013.01)

(58) Field of Classification Search
CPC ...... C09J 109/06; C09J 125/10; C09J 153/02; C09J 153/025
See application file for complete search history.

(56) References Cited

U.S. PATENT DOCUMENTS

| | | |
|---|---|---|
| 7,442,739 B1 | 10/2008 | Hatfield |
| 2004/0077759 A1 | 4/2004 | Bardiot et al. |
| 2011/0104487 A1* | 5/2011 | Schroeyers .............. C09J 7/381 428/355 BL |

FOREIGN PATENT DOCUMENTS

| | | |
|---|---|---|
| EP | 1674542 A1 | 6/2006 |
| WO | 9920709 A1 | 4/1999 |
| WO | 9928405 A1 | 6/1999 |

* cited by examiner

*Primary Examiner* — Ramsey Zacharia
(74) *Attorney, Agent, or Firm* — Sun Hee Lehmann

(57) ABSTRACT

The invention relates to a hotmelt adhesive comprising 10 to 40 wt % of at least one branched styrene-isoprene-styrene block copolymer having a weight percentage diblock fraction in the polymer of less than 30% and a melt flow index of less than 5 g/10 minutes at 200° C. under a test load of 5 kg; 0 to 40 wt % of at least one styrene polymer or styrene copolymer; 20 to 60 wt % of at least one tackifying resin; 0 to 15 wt % of at least one plasticizer; and 0 to 16 wt % of additives and auxiliaries selected from stabilizers, adhesion promoters, fillers or pigments, waxes and/or other polymers. Also included are the use thereof to bond films, and products, especially packaging products, that include this adhesive.

14 Claims, No Drawings

EXTRUDABLE HOTMELT ADHESIVES BASED ON BRANCHED SIS POLYMERS

FIELD OF THE INVENTION

The invention relates to hotmelt adhesives produced based on branched SIS copolymers having a block structure which, together with further auxiliaries, provide hotmelt adhesives having a high low-temperature flexibility, good adhesion, good film-forming properties, and very good processability in an extrusion process. Suitable uses for hotmelt adhesives of this type and products that include these adhesives are also described.

BACKGROUND OF THE INVENTION

Hotmelt adhesives, which are suitable for bonding a very wide range of materials, are known in general. US 2004/0077759 A1 describes hot co-extrudable self-adhering hotmelt adhesives that are particularly suitable for the production of multi-layer films for use in resealable packaging products. Films of this type comprise at least three layers: a first, outer layer, a sealing layer, which defines the inner side of the packaging product, and therebetween a resealable hotmelt adhesive layer. The described adhesives include tackifying resins and specific styrene-block-copolymers in precisely defined amounts.

By contrast with this disclosure, the present invention solves the application requirements based on an SIS polymer system that manages with a small fraction of SIS in the total formulation and also uses SIS block polymers having a diblock fraction of less than 30%, preferably less than 20%. The described adhesive system can be processed by extrusion and thus can be directly integrated in the production process for resealable packaging products.

In the case of resealable packaging products, the adhesive plays an important role insofar as the quality of the resealing and renewed opening are very substantially dependent on the adhesive properties. The adhesive must be self-adhering, i.e. the tackiness is attained by simply being pressed on by hand. These adhesives are known as PSAs (pressure-sensitive adhesives).

Hotmelt adhesives of this type must also have cohesion properties which, during the opening of the packaging products coated therewith, promote a cohesive separation, i.e. a separation within the adhesive layer whilst adhesive remains on both opened carrier materials. By contrast, an adhesive separation, i.e. a separation along the boundary layer between adhesive and carrier material, can be undesirable.

BRIEF DESCRIPTION OF THE INVENTION

The present invention solves the problem of providing an improved hotmelt adhesive for use in resealable packaging products that meets the above-described requirements.

In a first aspect, the invention therefore relates to a hotmelt adhesive, in particular an extrudable hotmelt adhesive, which contains:

a) 10 to 40 wt % of at least one branched styrene-isoprene-styrene block copolymer having a weight percentage diblock fraction in the polymer of less than 30%, preferably less than 20%, and a melt flow index of less than 5 g/10 minutes at 200° C. under a test load of 5 kg;

b) 0 to 40 wt %, preferably 10 to 20 wt %, of at least one styrene polymer or styrene copolymer, in particular selected from styrene-ethylene/butylene-styrene (SEBS), styrene-ethylene/propylene-styrene (SEPS), styrene-ethylene-propylene (SEP), styrene-butadiene-styrene (SBS) and styrene-isoprene/butadiene-styrene (SIBS) block copolymers, preferably with a melt flow index of less than 100 g/10 minutes, in particular less than 20 g/10 minutes, at 200° C. under a test load of 5 kg;

c) 20 to 60 wt % of at least one tackifying resin;

d) 0 to 15 wt % of at least one plasticizer; and e) 0 to 16 wt % of additives and auxiliaries selected from stabilizers, adhesion promoters, fillers or pigments, waxes and/or other polymers.

A further subject of the invention is the use of hotmelt adhesives of this type to bond film-like substrates.

Further aspects of the invention relate to a multi-layer film that consists of at least three layers and comprises an outer layer, a sealing layer, and a hotmelt adhesive layer disposed between the outer layer and the sealing layer for bonding the outer layer and the sealing layer, wherein the hotmelt adhesive layer includes or consists of the hotmelt adhesive according to the invention, and also a resealable packaging product, in particular for foodstuffs, which includes or consists of this multi-layer film.

DETAILED DESCRIPTION OF THE INVENTION

Where reference is made in the present application to molecular weights, the specified amounts relate to the weight average, i.e. the $M_w$ value, and not the arithmetic mean, unless specified otherwise.

The term "at least one", as used herein, means 1 or more, i.e. 1, 2, 3, 4, 5, 6, 7, 8, 9 or more. In relation to an ingredient, the term relates to the type of ingredient rather than the absolute number of molecules. "At least one copolymer" thus means, for example, at least one type of copolymer, i.e. that one type of copolymer or one mixture of a number of different copolymers can be used. Together with a specified weight, the term relates to all combinations of the specified type that are contained in the composition/mixture, i.e. that the composition does not contain any further compounds of this type beyond the specified amount of corresponding compounds.

All percentages specified in conjunction with the compositions described herein, unless specified otherwise, relate to wt %, in each case in relation to the mixture in question.

The hotmelt adhesives of the present invention contain at least one rubber-like block copolymer containing styrene, specifically a branched styrene-isoprene-styrene (SIS) block copolymer. This preferably has radial and/or star-shaped structures and a high degree of branching. Star-shaped polymers having more than 10 arms are particularly preferred. In the copolymer, the weight percentage diblock fraction in the polymer is less than 30%, preferably less than 20%, preferably from 5 to 20%, in particular around 15 wt %. The melt flow index is less than 5 g/10 minutes at 200° C. under a test load of 5 kg measured in accordance with ISO 1133 (Determination of the melt mass-flow rate (MFR) and the melt volume-flow rate (MVR) of thermoplastics).

SIS block copolymers are contained in the hotmelt adhesives in amounts from 10 to 40 wt %, preferably 20-35 wt %.

The copolymers suitable for the hotmelt adhesive according to the invention can be used individually, however it is also possible to use a plurality of copolymers, in particular two copolymers, together. In this case, the copolymers must be compatible.

In addition to the SIS block copolymer, the hotmelt adhesive can include further styrene-containing rubber-like polymers or copolymers that are different from the specified branched, styrene-isoprene-styrene block copolymers a). These further polymers or copolymers are linear, radial or star-shaped styrene polymers or styrene copolymers. The latter are preferably selected from styrene-ethylene/butylene styrene (SEBS), styrene-ethylene/propylene-styrene (SEPS), styrene-ethylene-propylene (SEP), styrene-butadiene-styrene (SBS), and styrene-isoprene/butadiene-styrene (SIBS) block copolymers. Linear styrene polymers or styrene copolymers are preferably additionally included, particularly preferably linear SEBS polymers. These additional styrene-containing polymers preferably have a melt flow index of less than 100 g/10 minutes, in particular less than 20 g/10 minutes, at 200° C. and under test load of 5 kg, measured in accordance with ISO 1133.

These additional styrene polymers are optional ingredients and are included in amounts from 0 to 40, preferably 5-40 wt %, preferably 10-20 wt %, in relation to the adhesive.

It is preferred in various embodiments for the hotmelt adhesives of the present invention to include a total of 45 wt % or less of the above-defined styrene-containing polymers, in particular the styrene-containing block copolymers.

A hotmelt adhesive according to the invention also includes at least one resin. The resin is intended to make the base polymer tacky. It is generally used in an amount from 20 to 60 wt %, in particular 35 to 60 wt %.

In principle, the known resins, such as aromatic, aliphatic or cycloaliphatic hydrocarbon resins for example, can each be used in fully or partially hydrogenated form, and modified or hydrogenated natural resins can also be used. Resins that are suitable for use within the scope of the invention are, for example, terpene resins, such as terpolymers or copolymers of terpene, natural resins based on rosin or tall oil resin inclusive of derivatives thereof, such as their pentaerythritol or glycerol esters, other modified natural resins such as resin acids from balsamic resin, tall oil resin, or wood rosin, possibly also hydroabietyl alcohol and its esters, acrylic acid copolymers such as styrene-acrylic acid copolymers, or copolymers consisting of ethylene, acrylate esters and maleic acid anhydride, or resins based on functional hydrocarbon resins. These can also be used partially as additives or auxiliaries.

The at least one tackifying resin can be an individual resin or preferably a resin mixture.

In various embodiments the resin comprises a fully or partially hydrogenated hydrocarbon resin and/or at least one natural resin based on rosin or tall oil resin or a pentaerythritol or glycerol ester thereof. The at least one fully or partially hydrogenated hydrocarbon resin can comprise, in particular, an aromatically modified resin, a polyterpene, a terpene phenol resin, a 1,3-pentadiene resin, a cyclopentadiene resin, a 2-methyl-2-butene copolymer, or a derivative of the aforementioned.

Preferred resin compositions that are used in the hotmelt adhesives of the invention contain:
i) 0-20 wt % of a fully or partially hydrogenated hydrocarbon resin, in particular of an aromatically modified resin, a polyterpene, a terpene phenol resin, a 1,3-pentadiene resin, a cyclopentadiene resin, a 2-methyl-2-butene copolymer or a derivative of the aforementioned, having a softening point from 0 to 50° C., preferably 8 to 12° C.; and/or
ii) 20-60 wt %, preferably 35-55 wt %, of a fully or partially hydrogenated hydrocarbon resin, in particular of an aromatically modified resin, a polyterpene, a terpene-phenol resin, a 1,3-pentadiene resin, a cyclopentadiene resin, a 2-methyl-2-butene copolymer or a derivative of the aforementioned, having a softening point from 80 to 150° C.; and/or
iii) 20-60 wt % of a natural resin based on rosin or tall oil resin, or of a pentaerythritol or glycerol ester thereof, or of a fully or partially hydrogenated hydrocarbon resin, in particular of a polyterpene, a terpene-phenol resin, a cyclopentadiene resin, or a derivative of the aforementioned, having a softening point from 80 to 140° C., in particular 95 to 105° C.

Particularly preferred resins are hydrocarbon resins, in particular mixtures of aromatically modified hydrocarbon resins according to ii) in amounts from 30-50 wt % in relation to the adhesive and 10-15 wt % of an aromatically modified, hydrogenated hydrocarbon resin according to i).

An exemplary mixture consists of aromatically modified C5 hydrocarbon resins having a softening point between 95 and 105° C., as are commercially obtainable for example under the trade names WINGTACK™ Extra Flakes (Cray Valley, USA), and aromatically modified, hydrogenated C9 hydrocarbon resins liquid at room temperature, as are commercially obtainable for example under the trade names REGALITE™ R (Eastman, USA).

The softening point is determined by means of the Ring & Ball method (ASTM method E28; ISO 4625).

A further constituent that can be included in the hotmelt adhesive is constituted by plasticizers. These can be selected from mineral oils, poly(iso)butylene, liquid or pasty hydrogenated hydrocarbons and low-molecular polyolefins. Suitable plasticizers include, but are not limited to, medicinal white oil, naphthenic mineral oils, polypropylene, polybutylene and polyisoprene oligomers, hydrogenated polyisoprene and/or polybutadiene oligomers, benzoate esters, phthalates, adipates, vegetable or animal oils, and derivatives thereof. Hydrogenated plasticizers are selected for example from the group of paraffin hydrocarbons. Polypropylene glycol and polybutylene glycol, and also polymethylene glycol, are also suitable. Esters can also be used as plasticizers, for example liquid polyesters and glycerol esters. Here, the molecular weight of polyalkylene glycols or polybutylene oligomers should lie preferably in the range of 200 to 6,000 g/mol, and polyolefins should have a molecular weight up to approximately 2,000 g/mol, in particular up to 1,000 g/mol. In particular, white oils, mineral oils, poly(iso)butylene and liquid or pasty hydrogenated hydrocarbons are suitable. Polyisobutylene having a molecular weight Mw of less than 5,000 is very particularly preferred.

The amount of plasticizers should be between 0 and 15 wt %. An excessively high fraction of plasticizers leads to reduced cohesive properties of the adhesive. Preferably, there is no plasticizer contained.

Furthermore, 0 to 16 wt %, preferably 0.5 to 16 wt %, of additives and auxiliaries, selected from stabilizers, adhesion promoters, fillers or pigments, waxes and/or other polymers, can be included in the hotmelt adhesive. Waxes can be added, optionally, to the hotmelt adhesive in amounts from 0.5 to 5 wt %. The amount is such, here, that on the one hand the viscosity is reduced to the desired range, but on the other hand the adhesion is not negatively influenced. The wax can be of natural origin, possibly also in chemically modified form, or of synthetic origin. Vegetable waxes or animal waxes can be used as natural waxes, or mineral waxes or petrochemical waxes. Hard waxes such as montan ester wax, Sasol wax, etc. can be used as chemically modified waxes. Polyalkylene waxes and also polyethylene glycol waxes are used as synthetic waxes. Petrochemical waxes such as petrolatum, paraffin waxes, microcrystalline waxes and synthetic waxes are preferably used. Paraffin and/or microcrystalline waxes and/or hydrogenated versions thereof, in particular polypropylene or polyethylene wax having a dropping point determined in accordance with ASTM D-3954 from 130 to 170° C. are particularly preferred.

The hotmelt adhesives according to the invention, besides the above-mentioned constituents, can also contain, as additives, further constituents used conventionally in hotmelt adhesives. These include, for example, stabilizers, adhesion promoters, antioxidants, fillers and/or pigments. Certain properties of the adhesive, such as cohesion, stability, adhesion or strength, can thus be influenced. The amount of additives and auxiliaries can preferably be 0 to 3 wt %. Particularly preferred additives include stabilizers against thermal and oxidative degradation and degradation caused by UV radiation.

Additives, such as stabilizers or adhesion promoters, are known to a person skilled in the art. These are commercial products, and a person skilled in the art can select them in accordance with the desired properties. Here, it should be noted that there is compatibility with the polymer mixture.

As optional constituent, the hotmelt adhesive according to the invention can contain 0 to 8 wt %, in particular 2 to 5 wt %, of further polymers different from the copolymers according to the invention. In particular, the amount of these polymers should be less than the amounts necessary in accordance with the invention of the block copolymers according to the invention. These polymers can improve different application-related properties of the hotmelt adhesive. for example heat resistance, low-temperature flexibility, cohesion and adhesion of the applied adhesive. These further polymers preferably do not contain any groups that cross-link under the production and storage conditions.

In further embodiments the hotmelt adhesive can therefore additionally contain at least one resilient polymer that is based on olefins and (meth)acrylic acid esters and that comprises carboxyl groups and/or anhydride groups. The olefin monomers can be selected from the known $C_2$ to $C_5$ olefins, in particular ethylene or propylene. The (meth) acrylic acid esters are selected from (meth)acrylic esters having low-molecular $C_1$ to $C_8$ alkanols, and in particular methyl(meth)acrylate, ethyl(meth)acrylate, propyl(meth) acrylate, butyl(meth)acrylate or 2-ethylhexyl(meth)acrylate are suitable, individually or in a mixture. The copolymer must also contain carboxyl groups and/or anhydride groups. This can be provided as a result of polymerization with appropriate functional monomers or by subsequent modification of the polyolefin copolymers. By way of example, it is possible to introduce COOH groups by oxidation. It is also possible to introduce COOH or anhydride groups into the polymer by radical grafting reactions, for example with maleic acid anhydride. Terpolymers from ethylene, acrylic acid ester and maleic acid anhydride having a melt flow index of 100-300/10 minutes at 190° C. under a test load of 2.6 kg (ISO 1133) are particularly preferred.

Polymers of this type usually have a molecular weight (mn) between 3,000 and 50,000 g/mol, in particular 8,000 to 25,000 g/mol. The amount of COOH/anhydride groups is in particular between 1 to 100 mg KOH/g, particularly preferably between 5 to 50 mg KOH/g. If the number of carboxyl groups is high, the compatibility of the constituents of the hotmelt adhesive becomes problematic. The softening point can lie in the range from 50° C. to 150° C., in particular from 90 to 110° C. The amount of the polymer carrying COOH groups should be between 0 and 15 wt %, in particular between 0.5 and 10 wt %. Suitable polymers containing carboxyl groups are commercially obtainable and known to a person skilled in the art.

A further example for resilient polymers is constituted by ethylene/propylene copolymers. These are known random copolymers.

Whereas the resilient polymers influence the flexibility of the hotmelt adhesive, the cohesion can be improved by fractions of additional, non-flexible thermoplastic polymers. In particular, the known thermoplastic polymers, such as EVA, and high-molecular polyolefins, such as poly-1-butene, are suitable.

Aromatically modified hydrocarbon resins and/or Fischer-Tropsch wax having a melting point of preferably 90-110° C. are likewise suitable as further polymer modifiers.

The hotmelt adhesive according to the invention is produced by known methods by mixing in the melt. Here, all components can be introduced at the same time, heated and then homogenized, or the more easily melting components are first introduced and mixed, and then the further resin constituents are added. It is also possible and preferable to produce the hotmelt adhesive continuously in an extruder. The suitable hotmelt adhesive is solid and, apart from impurities, is free from solvents.

The hotmelt adhesive suitable in accordance with the invention preferably has a viscosity of approximately 50,000 mPas or more, in particular of approximately 70,000 mPas, measured at 220° C. (Brookfield CAP, spindle 8). It is also preferred for it to have a softening point (Ring & Ball, ASTM E 28) of more than 100° C., in particular more than 120° C.

The high viscosity is necessary so that the hotmelt adhesive can still be extruded well, even at increased temperature.

The hotmelt adhesives described herein are suitable in particular for bonding film-like substrates, in particular as a hotmelt adhesive layer in a resealable packaging product with self-adhering device.

Packaging products of this type usually consist of multi-layer films that consist of at least three layers, specifically an outer layer, a sealing layer, and a hotmelt adhesive layer disposed between the outer layer and the sealing layer for bonding the outer layer and the sealing layer, wherein the hotmelt adhesive layer includes or consists of the hotmelt adhesive according to the invention.

The outer layer and the sealing layer can consist of any suitable material, for example based on polyolefins or polyesters. Examples of suitable materials, wherein mixtures of these are also suitable, include, but are not limited to: EVA, grafted EVA, for example with maleic acid anhydride, HEA, etc., EMA, PE, metallocene PE, grafted PE, grafted PP, ionomer, etc. The material can also contain fillers, antioxidants, lubricants, etc., which provide the film with the desired properties.

The outer layer preferably consists of polyethylene (PE) or polyethylene terephthalate, preferably PE. Here, the outer PE layer can, in turn, be fixedly bonded to a further layer applied thereto, for example a (printed) PET layer, for example by means of a PU adhesive. The sealing layer preferably consists of PE, in particular a low-density PE (LDPE), preferably having a density from 0.91-0.94 g/cm$^3$, and/or a high melt flow index.

In order to be able to produce multi-layer films of this type, various techniques and methods are used. By way of example, print coating, coextrusion coating, flat film coextrusion, and blown film coextrusion (see also Plastics Extrusion Technology, Friedhelm Hensen (author), Carl Hanser, Carl Hanser Publishers Munich, 1988).

In order to be able to be used for coextrusion, the adhesives of the invention are usually present in the form of granulate, which itself has been produced by means of extrusion at increased temperature and subsequent cutting, in particular strand cutting (after cooling, for example by means of cold water). The individual granulate bodies can then be sheathed by a (mineral) filler.

During the production of the multi-layer film, the hot-meltable self-adhering adhesive of the invention is preferably coextruded in granulate form between at least 2 thermoplastic materials, for example by blown film extrusion, in order to obtain an at least three-layer film, which has one side suitable for sealing and which preferably can be cut or torn, whereas the other is suitable for production of a packaging product and can be connected for example to a further film.

Exemplary three-layer films of this type have a sealing layer that can be cut and has a thickness from 10 to 100 µm, preferably 10 to 30 µm, a hotmelt adhesive as described herein with a thickness from 10 to 30 µm, preferably 15 to 20 µm, and an outer layer, which for example can be connected to a further layer or film and has a thickness from 10 to 100, preferably 10 to 30 µm.

The multi-layer films can be laminated by a further film, which for example is not suitable for sealing, in order to provide the packaging end product with certain mechanical properties, barrier effects, properties regarding printing, etc. The cover film can consist for example of PET, as mentioned above, however, metallized PET, OPP, OPA, CPA, PVC, APET, PAN, etc. are also suitable.

One aspect of the invention is directed to resealable packaging products of this type, in particular for foodstuffs, said packaging products including the described multi-layer films.

The packaging product can have the form of a bag or a tray. Here, the multi-layer film can be hot-sealed to itself or a suitable substrate. The packaging product obtained in this way remains closed during handling. When the packaging product is opened for the first time, the sealing layer is then broken open in such a way that, in the sealing region, the adhesive appears at the surface and can then be closed again by simply being pressed by hand in the region of the original welded connection. The opening and closing processes are possible a number of times in succession, the cohesion force of the adhesive being sufficient to ensure good resealability in this case as well.

The packaging products produced in this way can be used for numerous applications: foodstuff packaging products, in particular for cheese, sausage and foods that are heated in the oven or microwave prior to consumption. Such packaging products are also suitable for drugs, hygiene wipes, cleaning wipes, etc., wherein the wipes can contain cleaning emulsions or cosmetically active substances.

The following examples serve to explain the invention, however the invention is not limited thereto.

EXAMPLES

Example 1: Adhesive Formulation

An adhesive composition was produced which, in relation to the composition, contained the following constituents:

| | |
|---|---|
| Kraton HT 1200 KT (Kraton), star-shaped SIS block copolymer | 30 wt % |
| Kraton G 1657 (Kraton), linear SEBS triblock copolymer | 15 wt % |
| Regalite R1010 (Eastman), aromatic funct. hydrogenated C9 KW resin | 15 wt % |
| Wingtack Extra (Sartomer), aromatically funct. C5 KW resin | 40 wt % |

This adhesive had a viscosity of approximately 70,000 mPas at 220° C. (Brookfield CAP, spindle 8) and a softening point of more than 120° C. (ASTM E 28). It is suitable for the production of resealable packaging products which, with use of a 20 µm thick adhesive film, have an adhesion of approximately 6N/15 mm when first opened. When resealed and opened again, adhesions of at least 2 N/15 mm are achieved.

The invention claimed is:

1. An extrudable hotmelt adhesive comprising:
   a) 10 to 40 wt % of a star-shaped styrene-isoprene-styrene block copolymer having more than 10 arms and a weight percentage diblock fraction in the polymer of less than 30% and a melt flow index of less than 5 g/10 minutes at 200° C. under a test load of 5 kg;
   b) 0 to 40 wt % of a styrene polymer or a styrene copolymer, having a melt flow index of less than 100 g/10 minutes at 200° C. under a test load of 5 kg;
   c) 20 to 60 wt % of a tackifying resin;
   d) 0 to 15 wt % of a plasticizer; and
   e) 0 to 16 wt % of an additive selected from a stabilizer, adhesion promoter, filler, pigment, wax or other polymer than (a) and (b)

wherein the hotmelt adhesive (i) has a viscosity of more than 50,000 mPas, at 220° C. (Brookfield CAP, spindle 8) and/or (ii) has a softening point of more than 100° C.

2. The extrudable hotmelt adhesive according to claim 1, characterized in that
   (a) the star-shaped styrene-isoprene-styrene block copolymer has a weight percentage diblock fraction in the polymer of less than 20%; and
   (b) the styrene polymer or the styrene copolymer, having a melt flow index of less than 20 g/10 minutes at 200° C. under a test load of 5 kg, is selected from styrene-ethylene/butylene-styrene (SEBS), styrene-ethylene/propylene-styrene (SEPS), styrene-ethylene-propylene (SEP), styrene-butadiene-styrene (SBS) and styrene-isoprene/butadiene-styrene (SIBS) block copolymers.

3. The extrudable hotmelt adhesive according to claim 1, characterized in that the tackifying resin is a fully or partially hydrogenated hydrocarbon resin, a natural resin based on rosin or tall oil resin, a pentaerythritol or glycerol ester thereof, or a mixture thereof.

4. The extrudable hot melt adhesive according to claim 3, characterized in that the fully or partially hydrogenated hydrocarbon resin is an aromatically modified resin selected from the group consisting of polyterpene, terpene phenol resin, 1,3-pentadiene resin, cyclopentadiene resin, 2-methyl-2-butene copolymer, or derivatives thereof.

5. The extrudable hotmelt adhesive according to claim 3, characterized in that the tackifying resin comprises:
   (a) 20-60 wt % of an aromatically modified resin, a polyterpene, a terpene-phenol resin, a 1,3-pentadiene resin, a cyclopentadiene resin, a 2-methyl-2-butene copolymer or derivatives thereof, having a softening point from 80 to 150° C.;

(b) 20-60 wt % of a natural resin based on rosin or tall oil resin, pentaerythritol or glycerol ester thereof, fully or partially hydrogenated hydrocarbon resin, or derivatives thereof, having a softening point from 80 to 140° C.; and (c) 0-20 wt % of an aromatically modified resin, polyterpene, terpene phenol resin, 1,3-pentadiene resin, cyclopentadiene resin, 2-methyl-2-butene copolymer or derivatives thereof, having a softening point from 0 to 50° C.;

wherein the wt % is based on the total weight of the extrudable hotmelt adhesive.

6. The extrudable hotmelt adhesive according to claim 5, characterized in that the tackifying resin comprises:

(a) 35-55 wt % of the aromatically modified resin, polyterpene, terpene-phenol resin, cyclopentadiene resin or derivatives thereof;

(b) 20-60 wt % of the polyterpene, terpene-phenol resin, cyclopentadiene resin, or the derivatives thereof, having a softening point from 95 to 105° C.; and (c) 0-20 wt % of the aromatically modified resin, polyterpene, terpene-phenol resin, 1,3-pentadiene resin, cyclopentadiene resin, 2-methyl-2-butene copolymer or derivatives thereof, having a softening point from 8 to 12° C.

7. The extrudable hotmelt adhesive according to claim 1, characterized in that the plasticizer is selected from a mineral oil, poly(iso)butylene, liquid or pasty hydrogenated hydrocarbon or low-molecular polyolefin, having a molecular weight Mw of less than 5,000.

8. The extrudable hotmelt adhesive according to claim 7, characterized in that the plasticizer is poly(iso)butylene.

9. The extrudable hotmelt adhesive according to claim 1, characterized in that the additive comprises 0.5 to 5 wt % of a paraffin wax, microcrystalline wax, or derivatives thereof, having a dropping point determined in accordance with ASTM D-3954 from 130 to 170° C.

10. The extrudable hotmelt adhesive according to claim 9, characterized in that the additive further comprises:

(1) up to 3 wt % of a stabilizer; and (2) 2 to 5 wt % of (i) a terpolymer of ethylene, acrylic acid ester and maleic acid anhydride, having a melt flow index of 100-300/10 minutes at 190° C. under a test load of 2.6 kg (ISO 1133), (ii) an aromatically modified hydrocarbon resin, (iii) a Fischer-Tropsch wax having a melting point of 90-110° C., or mixtures thereof.

11. A multi-layer film comprising an outer layer, a sealing layer, and the extrudable hotmelt adhesive according to claim 1, wherein the extrudable hot melt adhesive is disposed between the outer layer and the sealing layer.

12. The multi-layer film according to claim 11, characterized in that the outer layer is a polyethylene or polyethylene terephthalate, and the sealing layer is polyethylene having a density from 0.91-0.94 g/cm$^3$.

13. The multi-layer film according to claim 12, characterized in that the outer layer is polyethylene.

14. A resealable packaging product comprising the multi-layer film according to claim 11.

* * * * *